Oct. 22, 1935.  M. J. COHAN  2,018,250
TUBE JOINT
Filed June 30, 1934  2 Sheets-Sheet 1
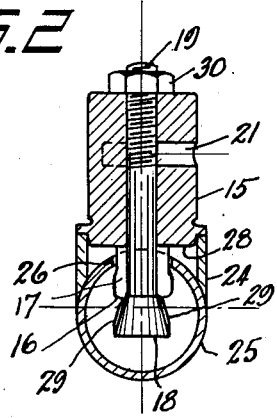
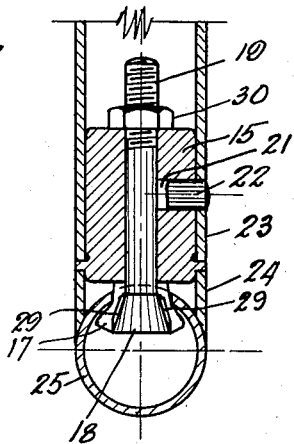
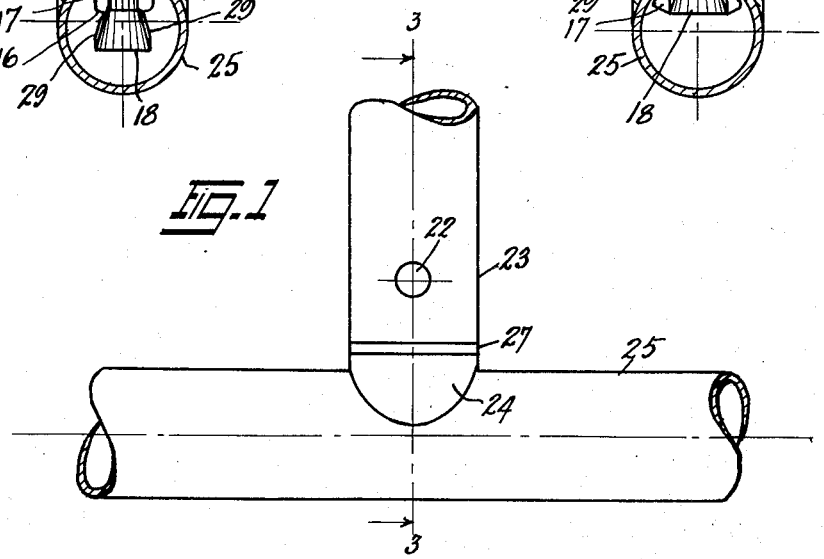
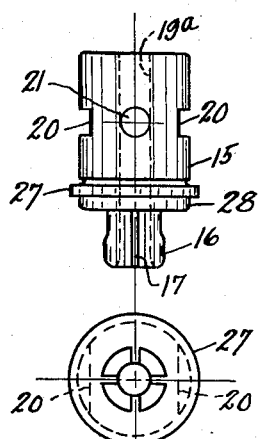
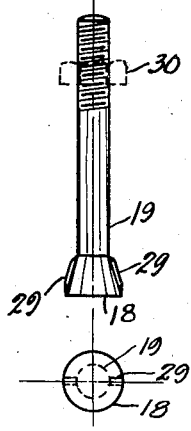
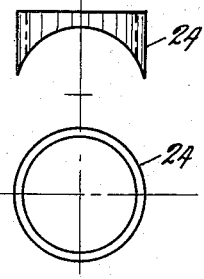
INVENTOR
Morris J. Cohan
BY
ATTORNEY Oct. 22, 1935.  M. J. COHAN  2,018,250

TUBE JOINT

Filed June 30, 1934  2 Sheets-Sheet 2

INVENTOR
Morris J. Cohan
BY
ATTORNEY

Patented Oct. 22, 1935

2,018,250

UNITED STATES PATENT OFFICE 2,018,250

TUBE JOINT

Morris J. Cohan, Brooklyn, N. Y.

Application June 30, 1934, Serial No. 733,213

6 Claims. (Cl. 287—54)

My present invention relates to a concealed weldless cope joint for tubings. It is an object of my invention to provide a tubular cope joint more commonly to be used in tubular furniture and the like.

Another object of the invention is to provide such a joint which is expansible, simple in construction and is composed only of a few parts which may easily and inexpensively be fabricated on a screw machine. By the use of my joint, connecting or assembling component parts of tubular furniture may easily be accomplished requiring only the locating and drilling of holes in the main tube members where joint occurs. By the use of my joint, connections in any angle to longitudinal axis of main tube member or radially about the main tube member may easily be accomplished. The assembling of the joint is a simple and elementary operation.

A further object of my invention is to eliminate the common practice of welding the joints in tubular furniture. This process is slow in operation and very difficult to locate the connecting or coping members exactly; even by the most elaborate jigs or fixture arrangement. When the welding of joints is completed, distortion due to heat produced in the welded parts takes place. This requires tedious adjustment and alignment of members.

The modernistic tubular furniture as fabricated today, such as chairs, tables, settees, etc. are usually chromium plated. To produce good chromium plating, the metal, especially the welded portions, must be ground and polished perfectly smooth and shiny. This is accomplished by several grinding and polishing operations prior to electroplating. During the electroplating process at least four polishing operations are required to bring out the desired effect and color. It is thus obvious that in a welded piece of tubular furniture the entire object must be handled during the various grinding, polishing and plating operations. This is an extremely costly process due to the objects being usually very bulky and cumbersome to handle in and about grinding and buffing machinery. A further objection to this old process is that very few completed articles by welding can be immersed in the electrolytic tanks due to their bulky nature. By the use of my invention, all above objectionable features can be eliminated. The component tubular parts may be fabricated, ground and polished and plated knocked-down and assembled after plating.

Another advantage of my improved joint is that when it is assembled and expanded in the tubes, the connection becomes very rigid in all directions and is able to withstand great pulling strength.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which—

Figure 1 is a front view in elevation showing two sections of tubes connected together by my improved joint.

Figure 2 is a longitudinal sectional view of the joint after it has been inserted into one section of tubing and before tightening same in position.

Figure 3 is a sectional view taken on line 3—3 Figure 1.

Figure 4 is a side view of the connecting plug.

Figure 5 is a bottom plan view thereof.

Figure 6 is a side view of the draw bolt.

Figure 7 is a bottom plan view thereof.

Figure 8 is a side view of the cope saddle.

Figure 9 is a plan view thereof.

Figure 10:
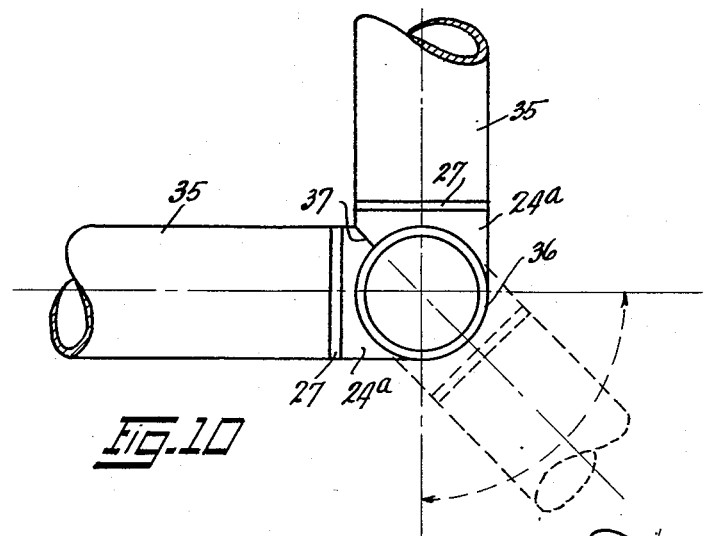
Figure 10 is a view showing a plurality of cope connections in various angles about a main tube member.

Referring now to the drawings in detail 15 indicates a connecting plug having a reduced portion or extension 16 which is provided with cross slots 17 so that the sections of the said extension may be readily spread apart by the head 18 of a draw bolt 19 passing through a central opening 19a in the plug. The plug 15 is provided with a pair of oppositely disposed flat surfaces 20 which may be engaged by a flat wrench to hold the said plug when expanding the projection 16. A hole or opening 21 is also provided in the body portion of the plug 15 for the reception of a pin 22 to lock the tube section 23 on the plug 15 after the joint is assembled. The said hole may also be used for the insertion of a spanner wrench to hold the plug in place instead of a flat wrench as heretofore described.

In assembling and joining two tubular sections together, I first place a cope saddle 24 upon the exterior of one tube section 25 which is provided with a hole or opening 26 and then insert the extension 16 into the tube 25 through the opening 26 and permit a shoulder or flange 27 on the said plug to rest upon the end of the saddle 24. The said plug is also provided with a reduced portion 28 which fits into the interior of the saddle 24. The said reduced portion 28 and the extension 16 centralize and properly locate the joint with respect to the tube 25 and saddle 24.

The head 18 of the bolt 19 is tapered and is provided with a pair of oppositely disposed ridges, ribs or fins 29 which enter and engage a pair of oppositely disposed slots 17 as the bolt 19 is drawn upwardly to expand the projection 16 when the nut 30 is rotated about the bolt, thus preventing any rotation of the said bolt during the tightening operation.

In Figure 10 I have shown in full lines a pair of right angularly disposed tube sections 35 extending radially from a main tube section 36 and joined thereto by a pair of my improved joints, the cope saddles 24a used in connection with this form of my invention being cut at an angle where they abut each other as at 37. I have also shown in broken lines that the tube 35 may be secured radially at any angle about the tube 36.

Figures 11, 12:
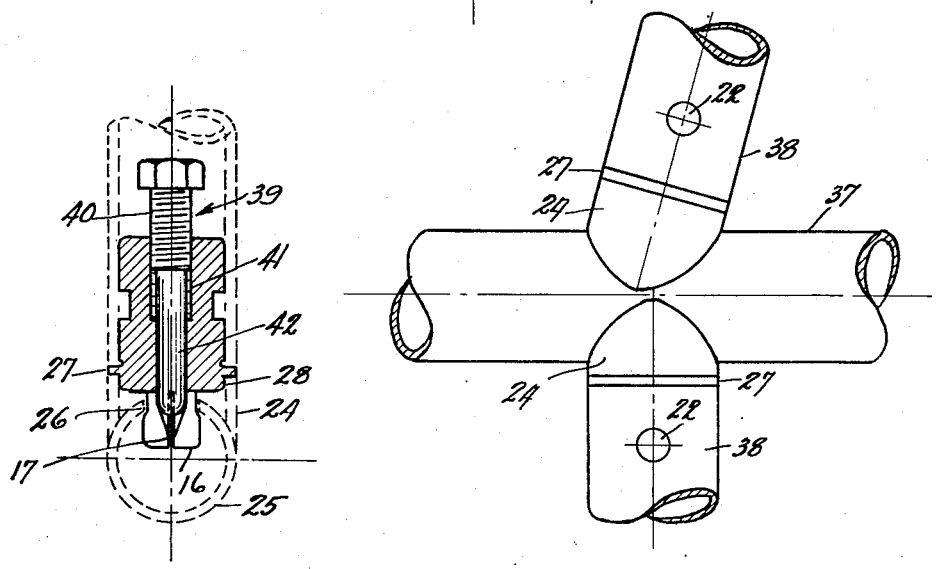
Figure 11 is a front view showing the method of connecting a combination of right and oblique angle copings to a main tube member.
Figure 12 is a sectional view of a modified form of my improved joint.

In Figure 11 I have shown a main tube 37 having a tube section 38 joined at right angles to the longitudinal axis of the said main tube, and a second tube 38 joined at an oblique angle to the said main tube axis.

In Figure 12 I have shown a modified form of the invention wherein instead of the draw bolt 19, I use a screw 39 provided with a threaded portion 40 adapted to engage a threaded opening 41 in the connecting plug 15, and having a threadless portion 42 for expanding the projection 16 at the bottom of the said plug when the said screw 39 is screwed down.

From the foregoing, it will be seen that I have provided a simple and efficient joint of its kind for rigidly connecting a saddle or hip section of tubing and the other tubular members which readily assembled and disassembled and disassembled.

Having described my invention what I claim is new and desire to secure by Letters Patent is:

1. A joint for connecting a pair of tubes, one being provided with a perforation, comprising a longitudinally perforated plug adapted to fit into an end of one of the tubes, a split projection adapted to enter the perforation in the other of the tubes, and means longitudinally movable in the plug perforation for expanding the split projection on the plug for clamping engagement with the said second mentioned tube.

2. A joint for connecting a pair of tubes, one being provided with a perforation, comprising a longitudinally perforated plug adapted to fit into an end of one of the tubes, a split projection adapted to enter the perforation in the other of the tubes, a tubular saddle adapted to be interposed between the plug and the second mentioned tube, and means longitudinally movable in the plug perforation for expanding the split projection on the plug for clamping engagement with the said second mentioned tube.

3. A joint for connecting a pair of tubes, one being provided with a perforation, comprising a longitudinally perforated plug adapted to fit into an end of one of the tubes, a split projection adapted to enter the perforation in the other of the tubes, a tubular saddle adapted to be interposed between the plug and the second mentioned tube, a bolt having a threaded end longitudinally movable in the plug, a tapered head at the other end of the bolt, and a nut on the threaded end of the bolt for the purpose specified.

4. A joint for connecting a pair of tubes, one being provided with a perforation, comprising a longitudinally perforated plug adapted to fit into an end of one of the tubes, a split projection adapted to enter the perforation in the other of the tubes, a tubular saddle adapted to be interposed between the plug and the second mentioned tube, a bolt having a threaded end longitudinally movable in the plug, a tapered head at the other end of the bolt, a pair of oppositely disposed tongues on the tapered head for engagement with the projection slots, and a nut on the threaded end of the bolt for the purpose specified.

5. A joint for connecting a pair of tubes one of which is provided with a perforation, comprising a longitudinally perforated plug, a portion of which is adapted to fit into an end of one of the said tubes, a flange below the said portion, a reduced portion below the said flange, a split projection below the said reduced portion adapted to enter the perforation in the other of said tubes, a tubular cope saddle for interposition between the flange and second mentioned tube, and means longitudinally movable in the plug perforation for expanding the split projection to clamp the plug to the said second mentioned tube.

6. In a tube joint of the nature described, a connecting plug adapted at one end thereof to longitudinally extend into one of the said tubes, a split projection at the other end thereof, a bolt having a threaded end adapted to expand the split projection to clamp the plug to the second mentioned tube, and a tubular saddle interposed between the plug and the second mentioned tube.

LAURENCE M. OLEMAN.